United States Patent [19]
Baldock

[11] 3,992,184
[45] Nov. 16, 1976

[54] SLOW-RELEASE FERTILIZERS

[75] Inventor: Peter John Baldock, Stockton-on-Tees, England

[73] Assignee: Imperial Chemical Industries Limited, London, England

[22] Filed: Feb. 13, 1975

[21] Appl. No.: 549,803

[30] Foreign Application Priority Data
Feb. 19, 1974 United Kingdom................. 7431/74

[52] U.S. Cl. .......................................... 71/62; 71/1; 71/31; 71/53; 71/63; 71/64 B; 71/64 F; 106/52
[51] Int. Cl.² ....................................... C05D 11/00
[58] Field of Search ............... 106/52; 71/31, 1, 53, 71/60, 62, 63, 64 B, 64 E, 64 F, 64 G

[56] References Cited
UNITED STATES PATENTS

| | | |
|---|---|---|
| 3,726,657 | 4/1973 | Verdaw............................ 106/52 X |
| 3,734,756 | 5/1973 | Pierce............................... 106/52 X |
| 3,811,853 | 5/1974 | Bartholemew et al........... 106/52 X |
| 3,824,106 | 7/1974 | Adams et al..................... 106/52 |

FOREIGN PATENTS OR APPLICATIONS 1,249,114  10/1971  United Kingdom............... 106/52 X Primary Examiner—Frank A. Spear, Jr.
Assistant Examiner—Ferris H. Lander
Attorney, Agent, or Firm—Cushman, Darby & Cushman

[57] ABSTRACT

A fertilizer from which potassium is released slowly comprises a frit produced from a potassium/silicon composition in the range $K_2O.2SiO_2$ to $K_2O.4SiO_2$ and containing from 5.5% to less than 10% by weight of calcium oxide.

6 Claims, 2 Drawing Figures

SLOW-RELEASE FERTILIZERS fertilizers

The present invention relates to potassium-containing fertilizers which release potassium into the soil at a very much slower rate than conventional fertilizers (for example, over a period of several months) so that a single application of fertilizer can be made where, previously, several applications were necessary.

In the specialist fertilizer market, slow-release nitrogen has become established over the last few years and this has presented an incentive to produce a slow-release potassium fertilizer. For coating purposes, as in the sulphur-coating process for urea, it is desirable to have a smooth substrate, such as that of a urea prill. Coating of granulated materials is far less efficient, requiring a much higher level of coating to achieve an equivalent release rate.

Smooth-surfaced potash substrates are not generally available, although prilled potassium chloride is available from Germany in small quantities.

We have found that an alternative method of producing slow-release potassium-fertilizer is to use a slowly-soluble material, such as a glass frit. Frits are made by decomposing metal salts, with fluxes, in a furnace at about 1200° C to give a glass melt consisting of the metal oxides. This is then poured into water to quench it, giving a friable glass which can be readily kibbled to produce a fine powder suitable for a vitreous enamel. Alternatively the melt may be quenched in air. For fertilizer production, the quenching and kibbling processes can be controlled to give a material of the required particle size, say 1 to 3 mm. Glass frits have the added advantage that trace elements can be incorporated at very little extra cost.

The possible sources of potassium, with their approximate current market prices for reasonably pure grades, are as follows:

| | | | | |
|---|---|---|---|---|
| KCl | 60%$K_2O$ | 47 | /to | = 0.8/ %$K_2O$ |
| $K_2SO_4$ | 48%$K_2O$ | 56 | /to | = 1.2/ %$K_2O$ |
| $KNO_3$ | 46%$K_2O$ | 72 | /to | = 1.6/ %$K_2O$ |
| $K_2CO_3$ | 65%$K_2O$ | 90-110 | /to | = 1.4 to 1.7/ %$K_2O$ |
| K Feldspar | 11%$K_2O$ | 25-50 | /to | = 2.3 to 4.5/ %$K_2O$ |

DESCRIPTION OF PREFERRED EMBODIMENTS

Preliminary experiments showed it might be difficult to use the chloride of sulphate sources in the frit production:

The chloride tended to sublime during the melting process, while the sulphate mixture tended to shatter when water-quenched, besides having relatively poor melting characteristics. The nitrate gave no real problems and could be processed quite easily. The carbonate also behaved satisfactorily.

We have also found that the solubilities of $K_2O/SiO_2$ frits are progressively reduced by the addition to the melt of up to 10% CaO, at which inclusion rate the $K_2O$ release rate is very slow. This is particularly noticeable for frits having a composition between $K_2O.2SiO_2$ (44% $K_2O$) and $K_2O.$ and $K_2O.4SiO_2$ (27% $K_2O$). Such frits have a relatively low melting point.

The composition area chosen to experiment in was the region 35% $K_2O$, with up to about 10% CaO. This is a fairly large region of low melting-point, of the composition $4K_2O.CaO.10SiO_2$. It proved to be of the correct order of solubility and produced a product of a suitable price range.

The present invention provides a fertilizer from which potassium is released slowly, comprising a frit produced from a potassium/silicon composition in the range $K_2O.2SiO_2$ to $K_2O.4SiO_2$ and containing not less than 5.5% to less than 10%, preferably from 6.5% to 9%, by weight of calcium oxide. Preferably, the frit is made from a composition of approximately $4K_2O.CaO.10SiO_2$. The $K_2O$ content of the fertilizer is preferably about 34% to 38% by weight, and the $SiO_2$ content between about 42% and 57% by weight. The preferred CaO content is from 7% to 9% by weight.

A series of frits were produced using $KNO_3$ as the potash source.

All frits were ground and sieved to − 2.8 + 1.4mm prior to analysis. The compositions were determined by XRF for the three major oxides, and by atomic absorption and mass spectrometry for the trace elements. The analyses of the frits obtained are given in Table 1. $K_2O$ release rates were determined in the laboratory by allowing the frit to stand in quiescent water for up to 200 days. The solution was analysed for $K_2O$ content by a UV spectrophotometric method using sodium tetraphenyl borate. The results of the release rate measurements are shown in FIGS. 1 and 2 of the accompanying drawings.

Figure 1:
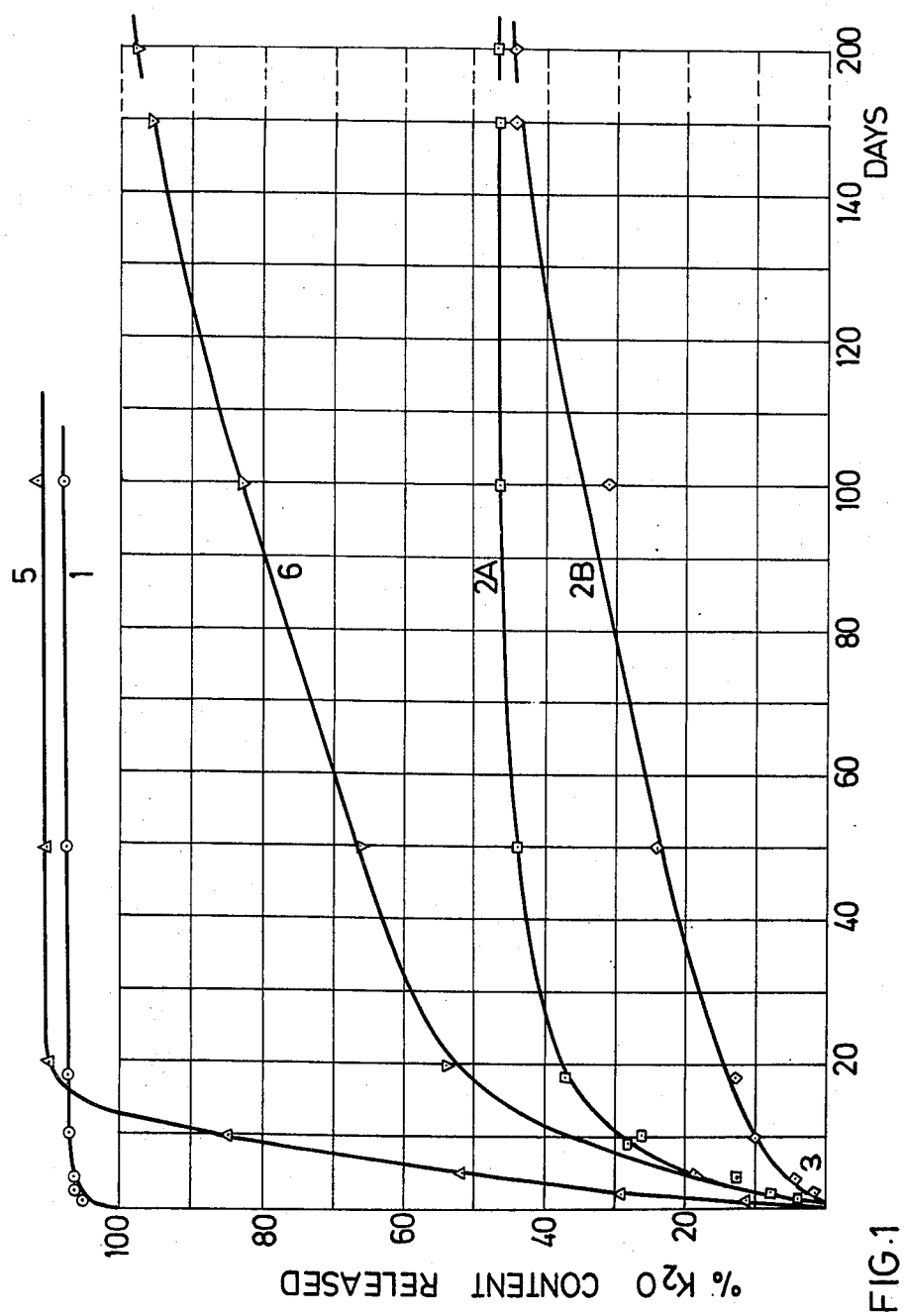
FIGS. 1 and 2 describe release rate measurements of potassium oxide.
Figure 2:
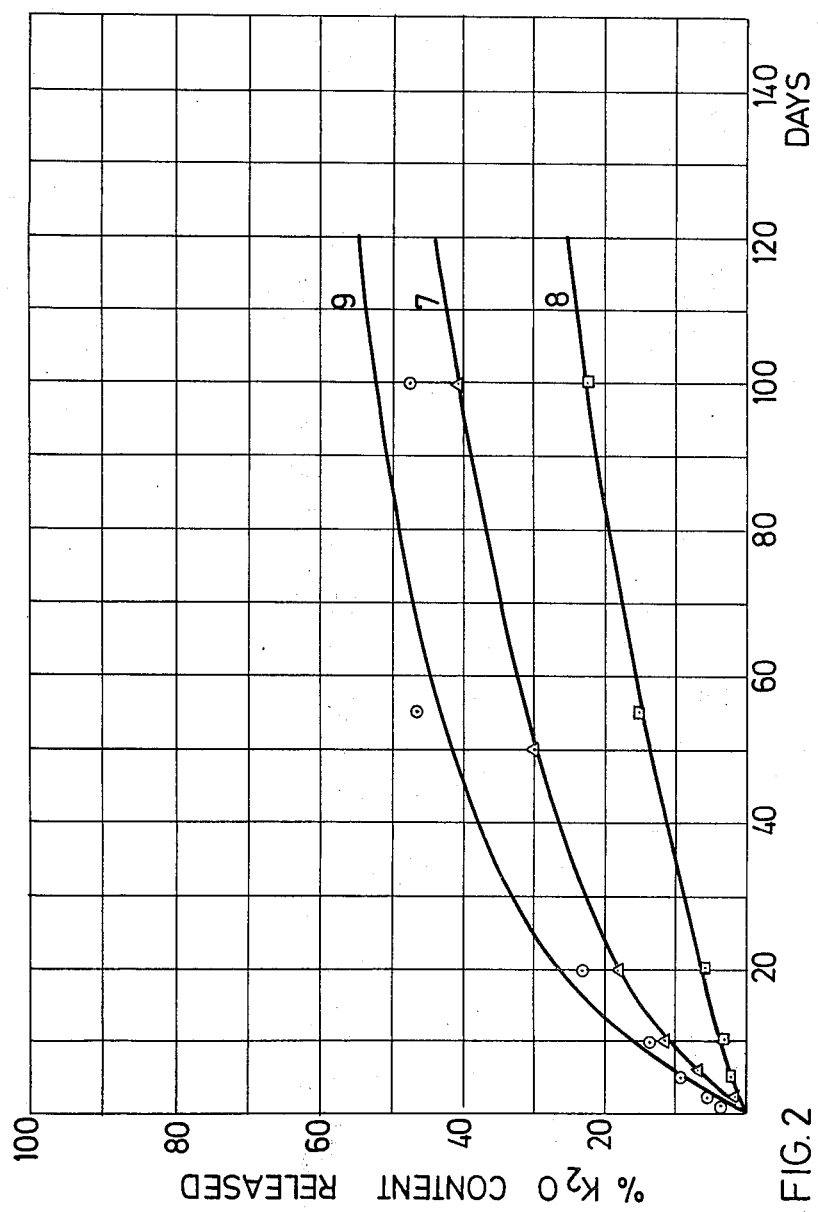

The release rate curves in FIG. 1 show the control of solubility which can be achieved by adding up to 10% CaO to a $K_2O.2SiO_2$ composition. The compositions Nos. 1 and 5, with less than 5.5% CaO, are readily soluble, while composition No. 3 with 10% CaO shows no significant solubility after 4 days. About 7% CaO appears to be the correct amount to give complete release in 150 days.

There is a fairly wide discrepancy betwen the release rates of frits Nos. 2A and 6, which are of the same composition. Frit preparation factors, such as melting rate, can affect the release rate, so these variations in release rate may be the result of variations in melting practice.

The release rates of frits Nos. 7 to 9 are consistent with the effect of the CaO content (Nos. 7 and 9 containing 8.9% CaO have a significantly higher release than No. 8 with 9.3% CaO). The inclusion of the trace elements does not appear markedly to affect the release rates.

Work on the mechanisms of alkali metal silicate solubility shows that there are two stages in the solution process:

i. An ion exchange process between the alkali metal ions in the glass and the hydrogen ions in the aqueous phase. The ease of exchange between H$^+$ and the monovalent cation is the prime reason for the solubility of these compounds. As a result of this exchange a protective layer of silicic acid is formed on the surface of the glass and the aqueous phase become alkaline due to the OH produced.

ii. As the aqueous phase becomes progressively more alkaline it eventually attacks the protective layer of silicic acid. The resistance to attack depends on the degree of polymerization of the silicate in the original glass.

Since, to a first approximation, the concentration of $K_2O$ does not change when up to 10% CaO is added to a $K_2O.2SiO_2$ composition, the first step in the dissolution should not be affected by CaO. The rapid decrease in solubility must result from the $Ca^{++}$ in the surface layer increasing the strength of the bonds and rendering them impervious to attack by the alkaline solution. At the 10% CaO level X-ray diffraction examination showed no real evidence of significant crystallisation having occured, so the increased resistance is not due to substantial addition energy being required to break down a crystal lattice.

TABLE 1

ANALYSIS OF EXPERIMENTAL POTASH FRITS

| Frit No. | %$K_2O$ | %$SiO_2$ | %CaO | %Fe | %Zn | %Mn | %Cu | %Mo | %B | Quenching Medium |
|---|---|---|---|---|---|---|---|---|---|---|
| 1 | 38.0 | 61.9 | — | — | — | — | — | — | — | Water |
| 2A | 37.4 | 55.6 | 7.0 | — | — | — | — | — | — | Water |
| 2B | 36.4 | 56.6 | 7.0 | — | — | — | — | — | — | Air |
| 3 | 30 | 60 | 10 | — | — | — | — | — | — | Water |
| 5 | 37.8 | 56.9 | 5.3 | — | — | — | — | — | — | Water |
| 6 | 37.4 | 55.6 | 7.0 | — | — | — | — | — | — | Water |
| 7 | 36.2 | 54.7 | 8.8 | 0.20 | 0.10 | 0.064 | 0.031 | 0.01 | 0.1 | Water |
| 8 | 34.7 | 55.3 | 9.3 | 0.56 | 0.22 | 0.19 | 0.096 | 0.01 | 0.2 | Water |
| 9 | 35.7 | 52.1 | 8.9 | 1.4 | 0.7 | 0.6 | 0.3 | 0.03 | 0.25 | Water |

I claim:

1. A fertilizer from which potassium is released slowly, comprising a frit produced from a potassium/silicon composition in the range $K_2O.2SiO_2$ to $K_2O.4SiO_2$ and containing from 5.5% to less than 10% by weight of the frit of calcium oxide.

2. A fertilizer as claimed in claim 1, containing from 6.5% to 9% by weight of calcium oxide.

3. A fertilizer as claimed in claim 1, comprising a frit produced from a composition of approximately $4K_2O.CaO.10SiO_2$.

4. A fertilizer as claimed in claim 1, wherein the $K_2O$ content is between 34% and 38% by weight, the $SiO_2$ content is between 52% and 57% by weight, and the CaO content is between 7% and 9% by weight.

5. A fertilizer as claimed in claim 1, wherein the source of potassium is potassium nitrate.

6. A fertilizer as claimed in claim 1, wherein the source of potassium is potassium carbonate.

* * * * *